United States Patent [19]

Person et al.

[11] 4,234,269
[45] Nov. 18, 1980

[54] DEPLOYMENT, RELEASE AND RECOVERY OF OCEAN RISER PIPES

[75] Inventors: Abraham Person, Los Alamitos; Sherman B. Wetmore, Westminster; James F. McNary, Santa Ana, all of Calif.

[73] Assignee: Global Marine, Inc., Los Angeles, Calif.

[21] Appl. No.: 935,672

[22] Filed: Aug. 21, 1978

[51] Int. Cl.² .............................................. F02D 21/00
[52] U.S. Cl. ..................................... 405/195; 405/52; 405/188; 114/264
[58] Field of Search .......... 405/195, 52, 188, 196–209; 114/264–267; 261/25

[56] References Cited

U.S. PATENT DOCUMENTS

| | | | |
|---|---|---|---|
| 1,643,733 | 9/1927 | Wood | 405/188 X |
| 1,872,212 | 8/1932 | Zahrajian | 405/188 X |
| 2,827,268 | 3/1958 | Staaf | 405/52 X |
| 3,540,222 | 11/1970 | Mendelson | 405/52 |
| 3,656,307 | 4/1972 | Mott | 405/188 |
| 3,758,083 | 9/1973 | Palmer | 405/52 X |
| 4,069,680 | 1/1978 | Erler | 405/195 |
| 4,086,865 | 5/1978 | Statham | 405/188 X |
| 4,094,159 | 6/1978 | Hettinger | 405/188 |
| 4,116,009 | 9/1978 | Daubin | 405/195 X |

Primary Examiner—Dennis L. Taylor
Attorney, Agent, or Firm—Christie, Parker & Hale

[57] ABSTRACT

An ocean thermal energy conversion facility includes a long pipe assembly which is supported at its upper end by the hull of the floating facility. Cold water flows to the facility from deep in the ocean. The pipe assembly comprises an elongate pipe construction and a weight connected to the lower end of the construction by a line of selected length. A floatation collar is connected to the construction at its upper end to cause the construction to have positive buoyancy and a center of buoyancy closer to the upper end of the construction than its center of mass. The weight renders the entire pipe assembly negatively buoyant. In the event that support of the pipe assembly should be lost, as by release of the assembly from the facility hull in an emergency, the assembly sinks to the ocean floor where it is moored by the weight. The pipe construction floats submerged above the ocean floor in a substantially vertical attitude which facilitates recovery of the assembly.

29 Claims, 21 Drawing Figures

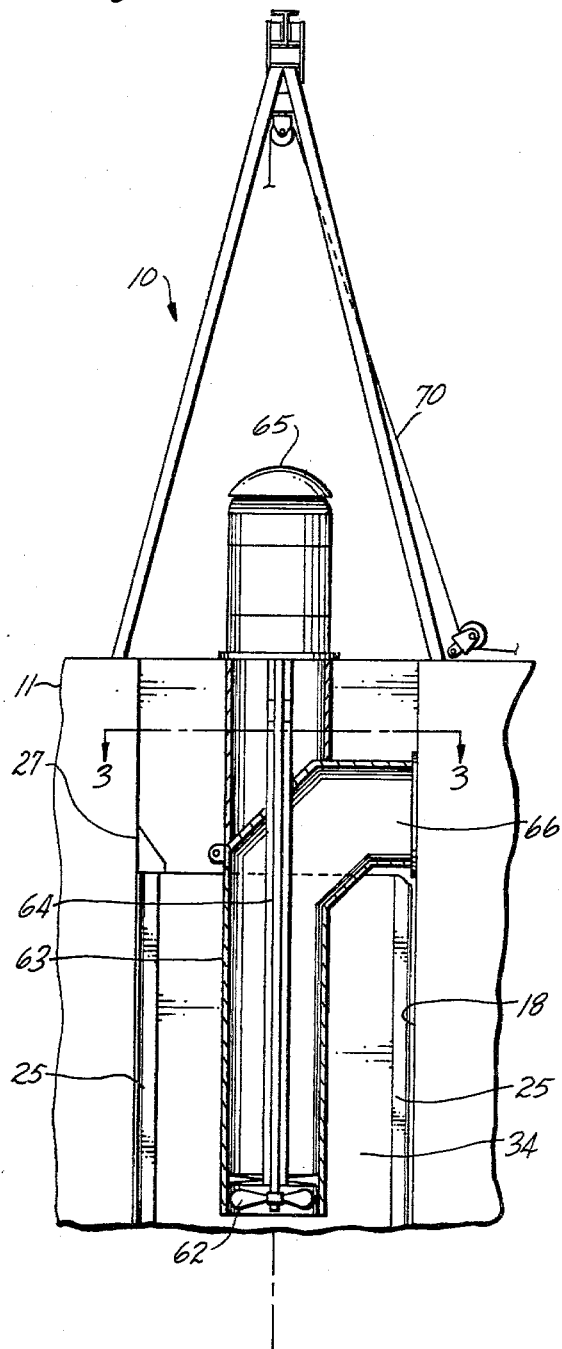
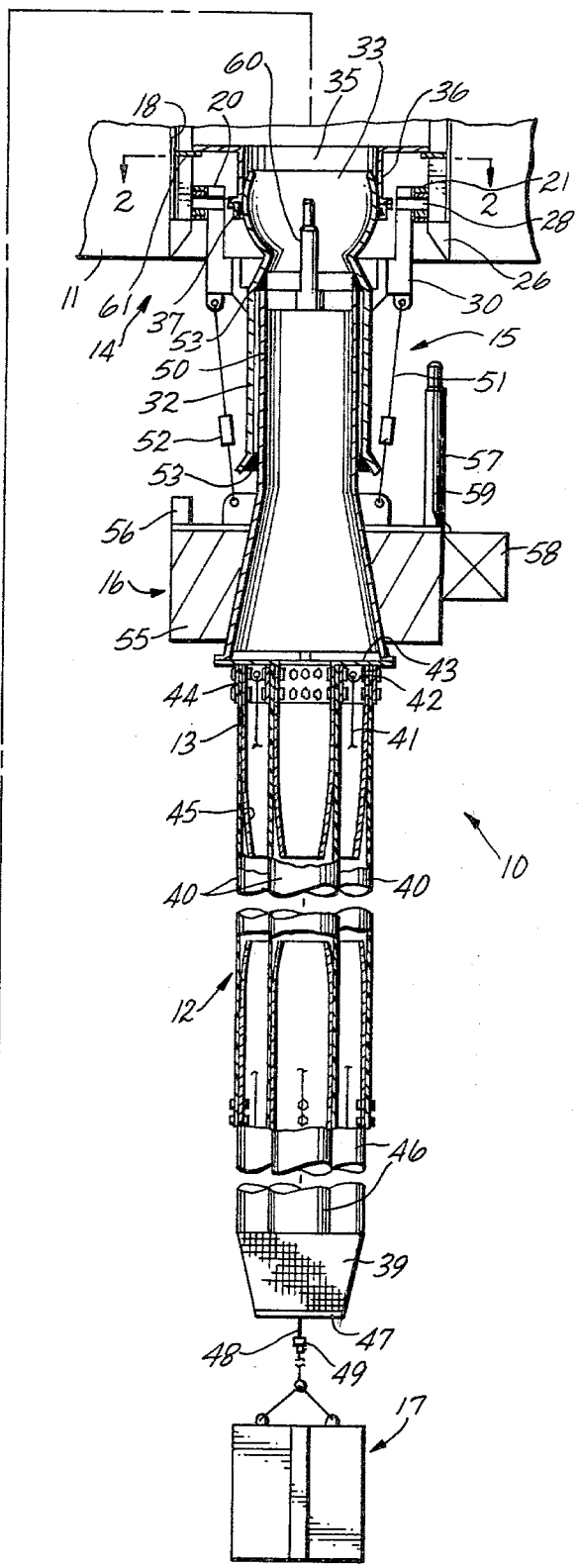
Fig. 1

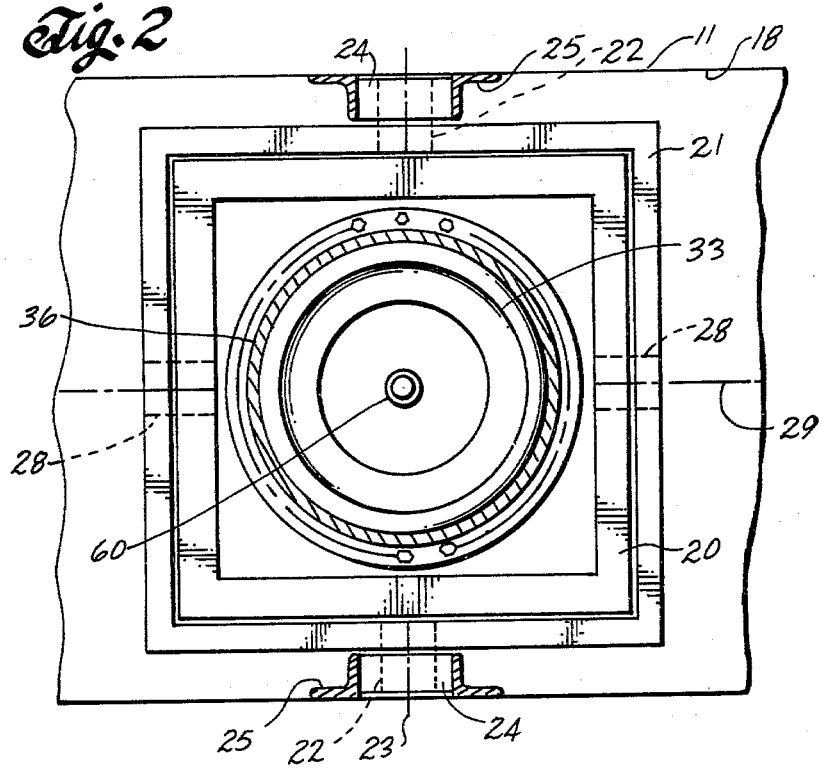
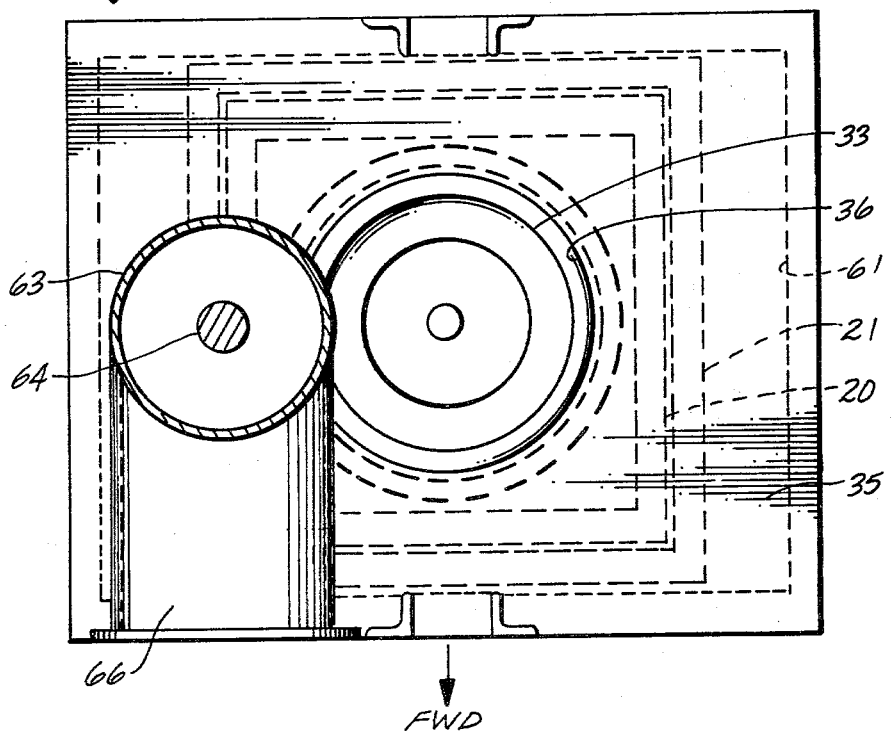

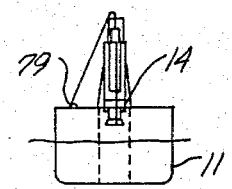
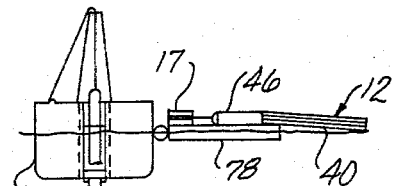
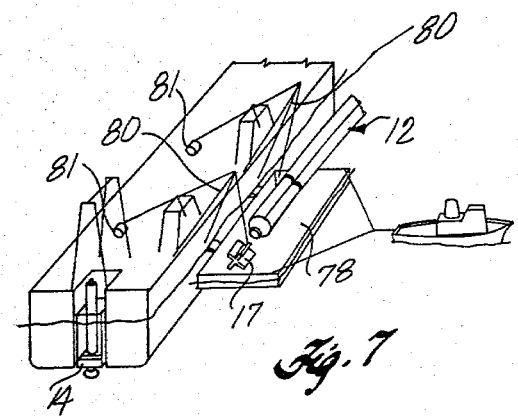
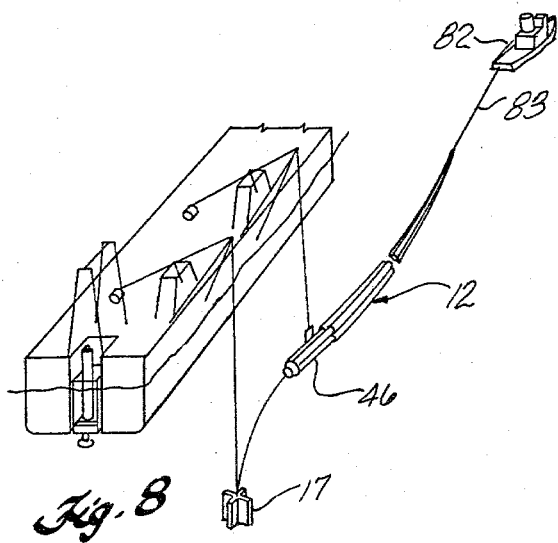

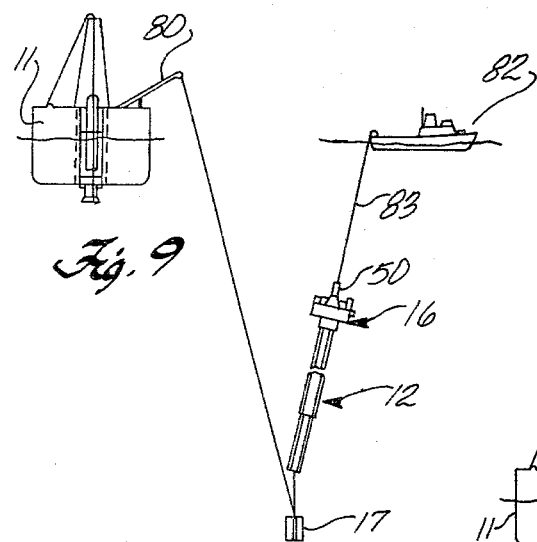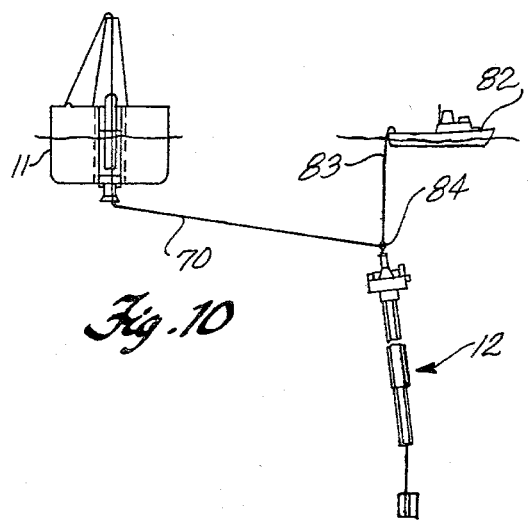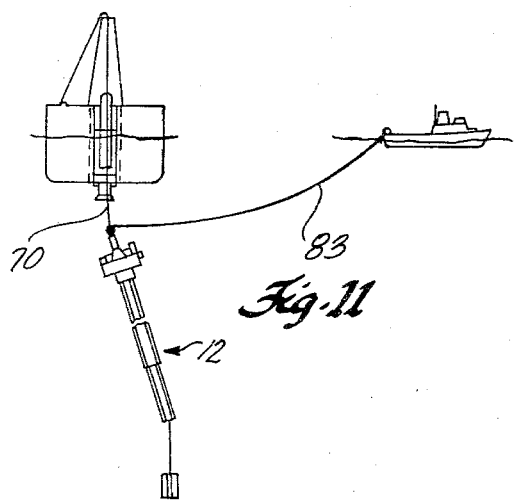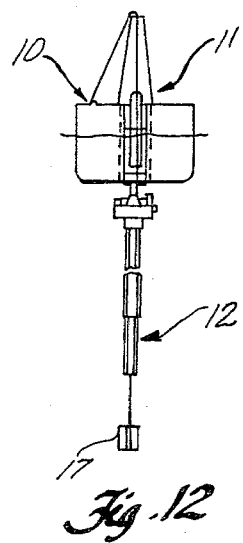

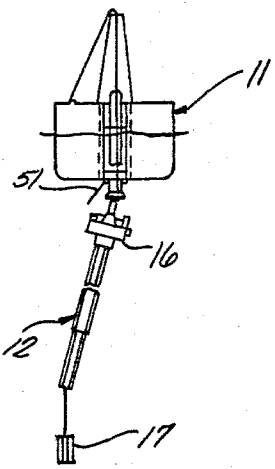
Fig. 13
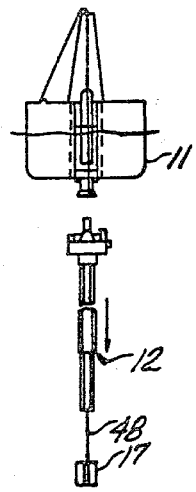
Fig. 14
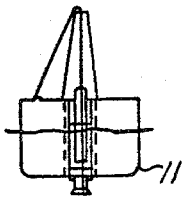
Fig. 15
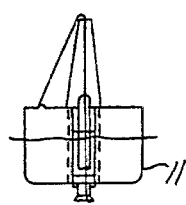
Fig. 16
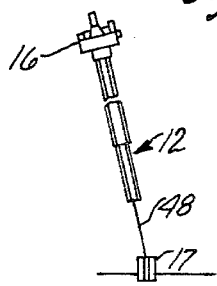
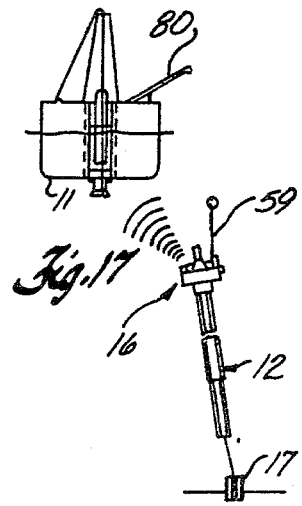
Fig. 17

_

DEPLOYMENT, RELEASE AND RECOVERY OF OCEAN RISER PIPES

REFERENCE TO RELATED APPLICATIONS

The present application contains drawings and detailed descriptions which are very similar to those found in four related applications each of which claims different aspects of the structure and procedure described in the present document. These other applications are as follows:

(1) Ser. No. 935,591 filed 8/21/78;
(2) Ser. No. 935,641 filed 8/21/78;
(3) Ser. No. 935,673 filed 8/21/78; and
(4) Ser. No. 935,674 filed 8/21/78.

Persons interested in the structures and procedures described in the present document, but not claimed herein, may find it useful to consider patents issued on these other applications or on any divisional or other applications based thereon.

Also, such persons may find it useful to consider the descriptions and claims of commonly-owned copending applications Ser. No. 886,904 now U.S. Pat. No. 4,176,863 and 886,907, both of which were filed Mar. 15, 1978. Application Ser. No. 886,904 pertains to a tensile core arrangement for a flexible, large diameter duct suspended in an ocean. Application Ser. No. 886,907 pertains to a stabilizing mass connected to the lower end of an elongate duct disposed pendulously in an ocean.

BACKGROUND OF THE INVENTION

Field of the Invention

This invention pertains to large diameter fluid flow ducts for use in ocean engineering and the like. More particularly, it pertains to a pipe assembly which, if support thereof from above is lost, sinks to the ocean floor and assumes a vertical attitude which facilitates recovery of the pipe assembly.

Review of the Prior Art and Its Problems

Many sophisticated proposals have been made in the field of ocean engineering which call for the use of large diameter vertical ducts of great length extending from at or near the ocean surface to lower ends unconnected to the ocean floor. These proposals include concepts for ocean thermal energy conversion and for mariculture.

The ocean thermal energy conversion (OTEC) concepts propose to use the difference in thermal energy levels between warm surface water and colder deep water to generate electricity, for example. The available energy level difference is low and so these proposals rely on the use of very large quantities of warm and cold water, and call for the necessary large volumes of deep ocean cold water to be brought to the hull of the facility at the water surface through very large vertical ducts of great length.

The presence of the pipe assembly depending from the OTEC hull effectively prevents the hull from moving off its assigned location in the event of an emergency or if it is necessary to maintain or service the hull. The pipe assembly therefore should be releasably connected to the hull so that it can be jettisoned when necessary. The pipe assembly is expensive as well as large, and the problem then becomes one of what to do with a jettisoned or released pipe assembly which may have a length of 2000 feet or more. Also, in view of its cost, it is desirable that a released pipe assembly be readily recoverable for continued use.

A need is thus seen to exist for an ocean engineering cold water riser pipe assembly which is both readily releasable from a supporting structure at or adjacent the ocean surface, and which, after release, is readily recoverable for re-use.

SUMMARY OF THE INVENTION

This invention addresses the need identified above. It provides a pipe assembly of the character useful in ocean engineering which is arranged for support at its upper end when in use, and which is readily releasable from such support. The pipe assembly is arranged to sink on release to the ocean floor, and to there assume an attitude which simplifies and enables ready recovery of the assembly. This invention also provides simple and effective procedures for initially installing the pipe assembly and for recovering the pipe assembly from the ocean floor.

Generally speaking, in structural terms pertinent to one aspect of the invention, it provides an elongate pipe assembly adapted to be disposed substantially vertically in an ocean with its upper end coupled for support to a structure adjacent the ocean surface; as so supported, the lower end of the pipe assembly is located above the ocean floor. The pipe assembly comprises an elongate pipe construction. Floatation means are connected to the construction at its upper end. The overall assembly has negative buoyancy. The floatation means has sufficient positive buoyancy to cause the center of buoyancy of the assembly to be so located in the assembly that, in the event of a loss of support of the upper end of the assembly, it sinks to the ocean floor and assumes a substantially vertical upright position. Upon release of the assembly from its supporting structure, it sinks to the ocean floor where it is, in effect, stored until recovery is desired. Recovery of the assembly is accomplished readily by virtue of the upright storage position of the assembly.

Such a pipe assembly can be used in various ocean engineering applications other than in an OTEC facility which is the presently preferred application described in detail herein. For example, such a pipe assembly can be used in mariculture in which nutrient-rich deep ocean water is brought to near the warmer ocean surface for the growth of various marine life forms such as kelp.

DESCRIPTION OF THE DRAWINGS

The above-mentioned and other features of this invention are more fully set forth in the following detailed description of the presently preferred embodiment of this invention, which description is presented with reference to the accompanying drawings, wherein:

FIG. 1 is a cross-sectional elevation view of an OTEC upwelling pipe assembly and the mechanism by which it is connected to a floating structure;

FIG. 2 is a fragmentary cross-sectional view taken along line 2—2 in FIG. 1;

FIG. 3 is a cross-section view taken along line 3—3 in FIG. 1;

FIGS. 5 through 12, inclusive, are simplified elevation and perspective views which illustrate various stages of a procedure for deploying the pipe assembly and connecting it to the floating structure; and FIGS. 13 through 21, inclusive, are simplified elevation views which illustrate various stages of a procedure for releasing the pipe assembly from the floating structure and recovering and reconnecting a released pipe assembly to the floating structure.

DESCRIPTION OF THE ILLUSTRATED EMBODIMENT

Figure 4:
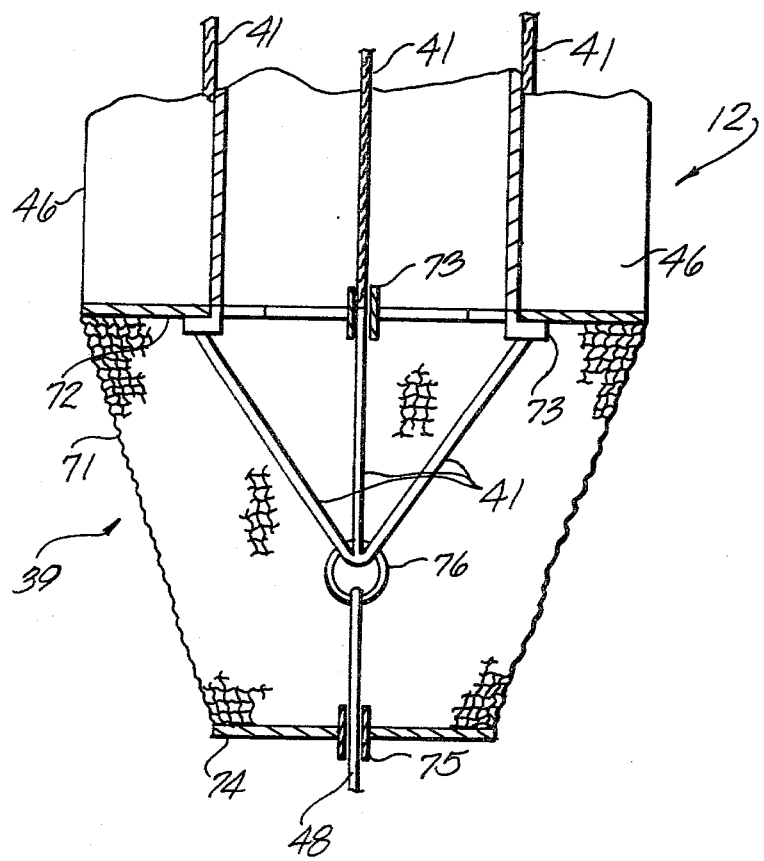
FIG. 4 is an enlarged cross-sectional elevation view of the inlet screen at the lower end of the pipe assembly.
Figure 18:
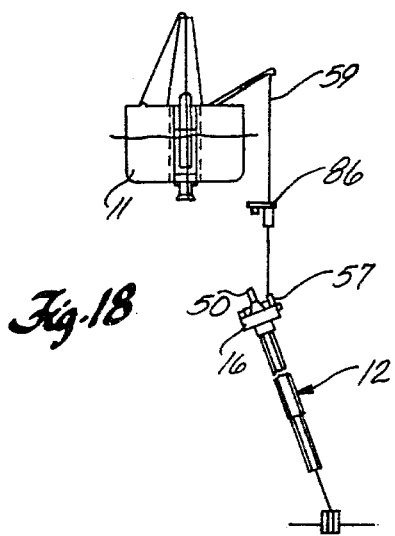
Figure 19:
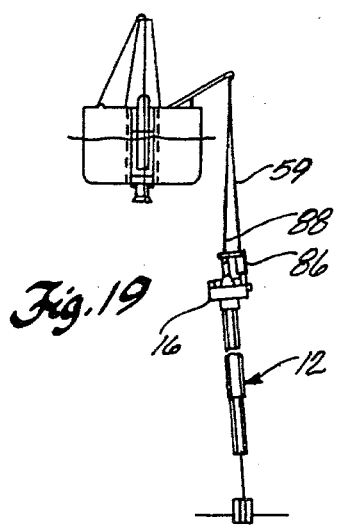
Figure 20:
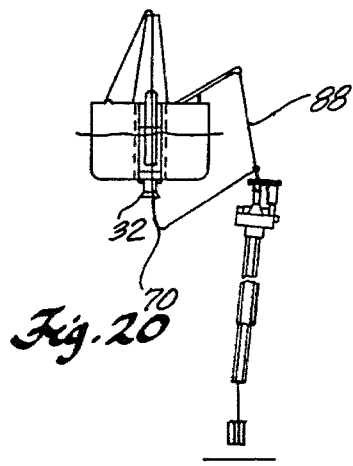

An ocean thermal energy conversion (OTEC) facility 10 is shown in FIG. 1. FIG. 1 is in two parts, and the broken line which interconnects these two parts shows how they are related to each other.

OTEC facility 10 includes a buoyant hull structure 11 which floats on the surface of an ocean at the desired location of the facility. Hull structure 11 may be the hull of a ship, such as a T-2 tanker, modified to serve as a major component of the OTEC facility, or it can be a structure constructed specially for this purpose. The desired location is at a place where the water depth is sufficiently great that, well below the surface, the temperature of the ocean water is sufficiently lower than the surface water temperature to provide the thermodynamic energy differential necessary to the operation of an OTEC facility. Typically, the water depth at the location where hull 11 is floated may be on the order of 4000 feet or more. Facility 10 also includes an upwelling pipe assembly 12 which is connected at its upper end 13, via a gimbal and ball joint suspension and coupling 14 and a quick-release connector assembly 15, to hull 11. A retrieval assembly 16 is associated with the upper end of the pipe assembly. A stabilizing bottom weight 17 is suspended below the lower end of the pipe assembly.

A well 18 opens through the bottom of the facility hull. The gimbal and ball joint suspension and coupling assembly is located, in use, at the lower end of well 18, and pipe assembly 12 is disposed below the hull substantially coaxially with the vertical centerline of the well.

As shown in FIGS. 1 and 2, gimbal and ball joint suspension and coupling 14 includes inner and outer gimbal rings 20 and 21. The outer gimbal ring is pivotally supported relative to hull 11 by a pair of trunions 22 which are coaxially aligned along a common axis 23 on opposite sides of the outer gimbal ring. Trunions 22 cooperate in suitable bearings located in the outer gimbal ring and in bearing blocks 24. Each of the bearing blocks cooperates between a pair of vertically extending guides 25 secured to the adjacent surfaces of well 18; the bearing blocks are vertically movable in the hull along the guides. The "in use" position of suspension and coupling 14 is shown in FIG. 1 wherein the bearing blocks are supported on bottom stops 26 secured to the hull to span the space between adjacent pairs of guides 25 closely above the lower end of well 18. Suitable upper stops 27 are provided at the upper ends of the guides within the well to limit the upward extend of movement of the bearing blocks in the guides.

A pair of trunions 28 interconnect the inner and outer gimbal rings at diametrically opposed locations on both of the rings. Trunions 28 are aligned along a second gimbal axis 29 which is perpendicular to and intersects gimbal axis 23. One of the gimbal axes lies in the longitudinal vertical center plane of hull 11, and the other extends transversely of the hull center plane. It is apparent that any structure connected to the inner gimbal ring will tend to remain in a stable position despite angular motions of the hull about either or both of the gimbal axes.

As shown in FIG. 1, the inner gimbal ring 20 includes a frame 30 which depends below the inner gimbal axis. An annular, downwardly open female socket member 32, an element of quick-release connector assembly 15, is connected to frame 30 in such manner that the axis of the socket member passes through the point at which gimbal axes 23 and 29 intersect. The socket member is flared circumferentially of its lower end. Adjacent its upper end, the tubular configuration of the socket member is tapered inwardly for a short distance along the length of the member into connection with the lower end of a hollow ball element 33 which has an outer surface defined as a portion of a sphere. Ball element 33 has its lower end disposed below the point of intersection of the gimbal axes, and has its upper end located above such point. The center of curvature of the ball element is centered upon the point of intersection of the gimbal axes. The ball element is hollow and is open at its upper end. The inner surfaces of the ball element define a portion of the boundaries of a fluid flow path, other portions of which are defined by the interior of pipe assembly 12 and by a cold water sump 34 defined in the lower portions of hull well 18.

The ball joint aspect of suspension and coupling 14 also includes an outer sleeve element 35 which cooperates with the spherical outer surface of the ball element. Sleeve element 35 is carried by the hull of facility 10. Element 35 has a tubular portion 36 which extends along the axis of the well from above and to below the point of intersection of the gimbal axes. At its lower end, tubular portion 36 carries a seal assembly 37 which cooperates with the spherical outer surface of the ball element to provide a substantially liquid-tight seal. This seal, however, is such that the ball element can move relative to the seal assembly. The motions of the ball element relative to the stationary sleeve element 35 are angular motions about the point of intersection of the gimbal axes.

Element 35 preferably defines the floor of cold water sump 34. To this end element 35, except for the presence of tubular portion 36 therein which cooperates with ball element 33, is generally flat and has a peripheral configuration which conforms to the contour of well 18, including appropriate cutouts in its perimeter to enable it to cooperate with bearing block guides 25. Element 35 is supported in its operative position on suitable support flanges 61 which extend inwardly from the walls of the well around its circumference except between adjacent bearing block guides 25.

Pipe assembly 12 is of great length. In a presently preferred embodiment of this invention, pipe assembly 12 has an overall length, from its upper end to the lower portion of a self-cleaning screen assembly 39 located at the lower end of the pipe assembly, of 2185 feet. The pipe assembly is flexible along its length in order that the generation of bending stresses in the pipe assembly due to the effects of ocean currents can be minimized. Preferably the pipe assembly is defined by three parallel lengths 40 of polyethylene pipe having a nominal diameter of 4 feet and a wall thickness on the order of 2 inches. A steel cable 41 extends within each individual pipe length over the entire elongate extend thereof, as shown in FIG. 1. The upper end of each cable 41 is connected to a support padeye 42 which depends from the lower surface of a transverse coupling plate 43 to which the upper end of each pipe length 40 is also connected. The connection of the upper end of each pipe length to the coupling plate is via an annular depending flange 44 which cooperates closely with the outer circumference of each pipe length, and via an elongate tubular blending nipple 45 which cooperates with the inner circumference of each pipe length for a selected distance along the pipe from its upper end. Each pipe and its blending nipple is connected to the corresponding outer circumferential flange 44 by a plurality of bolts passed through the flange, the pipe and the extreme upper end of the corresponding blending nipple.

As shown in FIG. 1, blending nipples 45 are not of constant diameter along their lengths. Rather, proceeding downwardly from their upper ends, they are tapered, preferably in a nonlinear manner, so that they have a diameter at their lower ends which is less than the inner diameter of the corresponding pipe length 40.

In view of the connection of weight 17 to the lower end of the pipe assembly and the gimballed suspension of the pipe assembly from hull 11, it is apparent that the pipe assembly tends to hang in a vertical pendulous manner from the hull. By virtue of the details of its design and construction, pipe assembly 12 is adapted to experience minimum bending stresses therein in response to current drag forces applied to the pipe assembly. The gimballed support of the upper end of the pipe assembly from the hull minimizes the transfer of angular motions of the floating structure, as by reason of roll or pitch in response to wave action, to the pipe assembly. To the extent that any angular motions of a nature such as to induce bending moments in the pipe assembly are transferred from the floating structure to the pipe assembly, such motions, and the loads occasioned thereby, are applied to the upper end of the pipe assembly by the blending nipples in such a manner as to minimize the generation of critical bending stresses within the material of the pipe assembly. This smooth and acceptable transfer of bending moments to the upper end of the pipe assembly is due to the tapered configuration of blending nipples 45. That is, such bending moments as may be applied to the upper end of the pipe assembly from the floating structure in use are not applied directly to the extreme upper end of the pipe assembly, but rather are transferred to the pipe assembly substantially uniformly over a distance corresponding to the length of the blending nipples.

A tubular steel transition and ballast section 46 is connected to the lower end of each pipe length 40, as shown in FIG. 1. Each section 46 has a portion of its length disposed within the lower terminal portion of each pipe length, and the remainder of the section extends below the lower end of the corresponding pipe length into connection with self-cleaning screen assembly 39 which terminates at its lower end at an inlet flow deflector plate 47. The portions of sections 46 which lie within pipe lengths 40 are configured in the same manner as blending nipples 45 to serve the same functions with respect to load transfer as the blending nipples.

As noted above, pipe assembly 12 is of great length; in the presently preferred embodiment, the pipe assembly has a length of 2185 feet from the keel of hull 11 to inlet screen 39. The assembly, when in use, passes through at least one ocean current and is subjected to current-induced drag forces. Because of its large diameter, thes drag forces are not insignificant and create in the assembly significant bending moments. These moments are largely static, but the pipe assembly will be subjected to dynamic loads due to vortex shedding and motions of hull 11 in heave and surge, for example. If the pipe assembly were of steel construction, such loadings would require a very heavy assembly having thick walls in order that stress levels in the walls be held within acceptable limits. These problems are avoided in pipe assembly 12 by making the assembly flexible along its length. A flexible pipe assembly deflects with applied loads, rather than stands against the loads. Such an assembly can have thinner walls, effectively, than a rigid pipe assembly.

Pipe assembly 12 preferably is defined of high density polyethylene which has the following properties:
Specific gravity: 0.95±0.002
Poisson's Ratio: 0.3 to 0.5
Thermal Conductivity: 2.5 BTU/hr-ft$^2$-°F.-in.
Coeff. of Thermal Expansion: $9 \times 10^{-5}$ in/in-°F.
Apparent Modulus of Elasticity (psi$\times 10^4$):

| Elapsed Time | 46° F. | 73° F. |
|---|---|---|
| One minute | 14.5 | 11.0 |
| One hour | 7.3 | 5.3 |
| 1000 hours | 4.5 | 3.4 |
| 5 years | 4.0 | 3.0 |

Each of pipes 40 is 2112 feet long and has a nominal diameter of 48 inches; the upper 1386 feet of each pipe length are defined of Series 60 pipe and the lower 726 feet are defined of Series 45 pipe. Tensile members 41 are defined by lengths of 1.0 inch wire rope brought together into a 2 inch wire rope 48. Stabilizing weight 17 has an immersed weight of 75,000 pounds and is disposed 300 feet below the lower end of the pipe assembly. The lower 65 feet or pipe assembly 12 per se are defined by transition sections 46 and by inlet screen 39.

In such an arrangement, the use of polyethylene to define pipe lengths 40 has several advantages which are realizable at relatively low cost. Polyethylene is buoyant in seawater. Positive buoyancy produces simple deployment, release and recovery procedures, resulting in economies of cost and shipboard space and reduced complexity. Polethylene has desirable physical properties; it is noncorrosive in seawater, not subject to endurance limits in the classical sense, and has smooth surfaces which minimize hydraulic losses, drag forces and biofouling rates. It is easily and effectively handled and welded. Its flexibility greatly reduced dynamic response to induced motions, resulting in low bending stress levels.

Analysis has shown that a polyethylene pipe assembly of the nature described above can adequately withstand environmental loadings, without the occurrence in the polyethylene of permanent molecular rearrangement, for a period of 5 years if installed in the Pacific Ocean off the west coast of Hawaii about 18 nautical miles northwest of Keahole Point and slightly south of Kawaihae where the Hawaiian storm current and the Hawaiian hurricane would be encountered.

It is noted that the presence of the tensioned cables 41 within the pipe lengths 40 enhances the ability of the polyethylene pipe lengths to accommodate the dynamic loads encountered in such an installation.

Within the lower extremities of the pipe assembly, i.e., within the vertical extent of self-cleaning screen 39, as shown in FIG. 4, the several steel cables 41 are brought together to define a single steel cable 48 which extends through deflector plate 47. Cable 48 is relied upon to carry the immersed weight of bottom weight 17. An acoustic, remotely operable quick-release coupling device 49 is provided in cable 48 between the lower end of the pipe assembly and bottom weight 17. As shown in FIG. 4, screen 39 is composed prinicipally of flexible steel netting 71 arranged as an inverted conical frustum. The netting is coupled between an upper carrier plate 72, which is connected to the lower ends of lower transition sections 46 and which is generally open in way of the ducts defined by such sections save for spiders which support a tubular guide 73 for each of cables 41 coaxially of the lower end of each section, and a circular bottom closure plate 74. A guide 75 is carried centrally of plate 74 to permit weight support cable 48 to pass through the plate from within the screen where it is connected, as at 76, to the lower ends of the several cables 41. Cables 41 and 48 pass loosely through guides 73 and 75, respectively.

The components of netting 71 are loosely interconnected in the netting, in the manner of chain mail. The netting flow area, porosity, and mesh size are selected to provide significantly greater water flow area through the netting than through the several transition sections 46; the netting does not provide any meaningful restriction on water flow into the lower end of pipe assembly 12. Preferably the netting surface area is about 5 times the flow area of the pipe assembly, the porosity is about 80%, and the mesh size is about 6 by 6 inches. The included angle of the conical frustum (one-half angle) is on the order of 20°.

In use of the pipe assembly, the lower end of the assembly will oscillate and move to and fro in response to vortex shedding as the ocean current moves past the pipe assembly, for example. This will cause the screen bottom plate to rattle relative to weight support cable 48. Such rattling shakes the netting and, in combination with the angle of the netting, frees the netting of any growth thereon and of any matter which might be caught thereon by reason of the water flow through the netting.

Steel cables 41 are relied upon to carry the immersed weight of bottom weight 17. It is apparent, therefore, that pipe assembly 12 is of the tensile core, flexible wall construction described in greater detail in copending application Ser. No. 886,904 filed Mar. 15, 1978. Bottom weight 17 is provided for the reasons described in application Ser. No. 886,907.

Coupling plate 43 at the upper end of pipe assembly 12 is connected to the lower end of a hollow, open-ended male pin coupling member 50, a constant diameter upper portion of which is cooperable with the interior of female socket member 32. Suitable seals 53 are carried by the female member at its tapered sections at the upper and lower ends of its constant diameter portion. These seals cooperate with the interior of the female member, when these two members are engaged, thereby to define an essentially watertight connection between the members. The seals become effective only on the last increment of motion of the male member into the female member. The male and female coupling members of quick-release connector assembly 15 are held in engagement by a plurality of tether cables 51 which are connected at their upper ends to padeyes carried by frame 30, and at their lower ends to padeyes connected to the exterior of the male coupling member. A remote release device 52 is provided in the length of each tether cable.

The length of pin member 50 between the locations at which it engages seals 53 is at least as great as, and preferably is longer than, the diameter of the pin member between the seals. This length is made as great as practicable. Such length is desired to make the engaged connection as insensitive as possible to bending loads applied to it, thereby to isolate the pipe assembly from bending loads, and also to prevent the connection from binding in such a way as to impair the ability of the pin member to drop free of the socket member if and when tether cables 51 are severed.

A recovery buoyancy collar 55 is disposed circumferentially about the lower end of male coupling member 50, below that portion of the member which is engaged in the female socket member when connector assembly 15 is assembled. The buoyancy of the collar is sufficient that, if it becomes necessary to jettison the pipe assembly from the hull, the collar holds the pipe assembly in a vertical attitude after the pipe assembly has dropped to the ocean floor. To facilitate location and recovery of a jettisoned pipe assembly, a locating acoustic pinger 56 and a reestablishment guide post 57 are mounted to the upper extent of the buoyancy collar. A recall buoy is disposed in a suitable container 58 located on the side of the buoyancy collar adjacent the base of post 57. A suitable buoy line 59 is connected from the upper end of post 57 to the buoy located within container 58.

A pipe assembly keelhaul latch post 60 is carried by the upper end of male pin member 50 and extends upwardly into ball member 33 along the axis of the pin member.

Buoyancy collar 55, pinger 56, guide post 57, and the recovery buoy and its container 58 are elements of retrieval assembly 16 which is carried by the upper end of pipe assembly 12 via male pin member 50.

As noted above, pipes 40 preferably are defined of polyethylene; polyethylene is positively buoyant in seawater. In view of the great length of the pipe assembly, blending nipples 46 extend along the pipe assembly a distance which is greater than the length of nipples 45 by an amount (about 65 feet) which is selected to cause the combination of pipes 40 and nipples 46 to have a desired amount of net negative buoyancy. Inlet screen assembly 39 is also negatively buoyant. Thus, the pipes 40 are under a modest axial tensile load in use, rather than a compressive load which otherwise would result from the positive buoyancy of polyethylene and which could cause the pipes to buckle. The net negative buoyancy of the combination of pipes 40 and nipples 46 is less than the net positive buoyancy of collar 55 and the other structure encountered at the upper end of the pipe assembly, including male pin member 50. The net negative buoyancy of weight 17 is greater than the net positive buoyancy of the portion of the pipe assembly above cable 48. For example, in the preferred embodiment described above, the net buoyancies of these components are as follows:

| | |
|---|---|
| Male member 50 and upper blending nipples 45 | −20,000 lb. |
| buoyancy collar | +30,000 lb. |
| polyethylene pipe | +60,000 lb. |
| lower blending nipples 46 and inlet screen 39 | −65,000 lb. |
| cables 41 and 48 | −17,500 lb. |
| stabilizing weight 17 | −75,000 lb. |

While the sum of these buoyancies is 87,500 lbs. net negative buoyancy, the pipe assembly itself (exclusive of weight 39 and its suspension cables) is 5000 lbs. positive.

In view of the foregoing, it is apparent that, when the structure described above is assembled in the manner shown in FIG. 1, a fluid flow duct, having an inlet at screen assembly 39, is defined from the lower end of the pipe assembly to cold water sump 34 within hull well 18. This duct provides a path for the flow of cold water from deep in the ocean upwardly to OTEC facility 10. Deep ocean cold water is induced to flow upwardly along this path by the action of a pump impeller 62 which is located in the open lower end of a tubular cold water intake duct 63 disposed within sump 34. Impeller 62 is mounted on the lower end of an elongate shaft 64, the upper end of which is connected to a drive motor 65 which preferably is located at the upper end of well 18. Between the pump impeller and drive motor, an elbow 66 is formed in duct 63 to cause cold water drawn into the duct to be discharged into a suitable tank or piping arrangement (not shown) within the hull of OTEC facility 10.

It will be apparent from an examination of the structure shown in the accompanying drawings that this structure provides for the ready and convenient assembly of the overall system, and also for ready jettisoning and recovery of the pipe assembly from the floating structure, as in the event of an emergency. Assembly and initial connection of the pipe assembly to hull 11 is shown, in stages in FIGS. 5 through 12, and jettisoning and recovery of the pipe assembly is shown in stages in FIGS. 13 through 21.

The pipe assembly preferably is made up and assembled at a shore-based location, as on a beach. The appropriate individual lengths of polyethylene pipe are welded together to define the flexible pipe assembly per se; the flotation and retrieval assembly is connected to one end of the piping, and the stabilization weight to the other. The negatively buoyant lower end of the pipe assembly and the stabilizing weight are placed on a barge 78 (see FIG. 6), and the rest of the pipe assembly, all of which is buoyant, is allowed to float behind the barge as it is towed to the installation site where hull 11 has been prepositioned. As so prepositioned (see FIGS. 5 and 6), the gimbal and ball joint assembly 14 will have been lowered in the hull using cable 70 and a winch 79 onboard the hull, and the cold water sump 34 will have been defined in well 18. When the barge arrives at the hull, the gimbal and ball joint assembly is in position adjacent the hull keel; see FIG. 6.

When barge 78 arrives alongside the hull, suitable devices, such as A-frames 80 and winches 81 aboard the hull (see FIG. 7), are rigged and connections made to the stabilizing weight and the lower end of the pipe assembly for controlled lifting and lowering thereof from the hull. The load is lifted from the barge and the barge towed out of the way, and then the load is lowered. As the lower end of the pipe assembly is lowered, an auxiliary vessel 82 maintains tension via a pendant line 83 on the upper end of the pipe assembly, as by connection to latch post 60. The flexibility and positive buoyancy of piping 40 is of benefit during these processes.

The pipe assembly is lowered unit it is vertical and its net negative buoyancy is supported by pendant line 83; see FIG. 9. The lines to weight 17 and the lower end of the pipe assembly are released, and cable 70 is then run down through ball joint 36,37 and to a connection point 84 in the pendant line just above latch post 60; see FIG. 10. The load of the pipe assembly is transferred from the pendant line to cable 70, and the pipe assembly is moved into position below female socket member 32. A diver can then release the pendant line from connection point 84. See FIG. 11. The pipe assembly is then drawn by cable 70 into seating engagement of pin member 50 with socket member 32, and a diver secures together cables 51. Cable 70 is thereafter disconnected from latch post 60 to enable the pump assembly, including duct 63 and elbow 66, to be lowered into position within sump 34, and to enable the appropriate mechanical connection of the pump assembly to the hull to be made. Preferably, however, the pump assembly is disposed off-center of well 18, so that keelhauling of the pipe assembly into connection with the gimbal and ball joint suspension coupling 14 can be accomplished with the pump assembly in place in sump 34.

If, at any time during the operation of OTEC facility 10, circumstances should occur which would require disconnection of the pipe assembly from the hull, jettisoning of the pipe assembly is a simple matter. An appropriate release signal is generated to cause actuation of remotely operated quick-release couplings 52 associated with tether cables 51. Couplings 52 operate in such manner that the tether cables part substantially simultaneously. As the tether cables part, all support of the upper end of the pipe assembly by the hull is terminated. Since the net buoyancy of the pipe assembly is negative due to the connection of bottom weight 17 to the pipe assembly, the pipe assembly drops downwardly from the hull, carrying male pin member 50 with it but leaving the female socket member and ball element 33 connected to the floating structure via the gimbal arrangement. Once the bottom weight impacts the ocean floor, the pipe assembly is maintained in a vertical attitude by reason of the positive buoyancy of collar 35 at the upper end of the pipe assembly. This is shown, is sequence, in FIGS. 13 through 16.

The length of cable 48, between inlet screen 39 and stabilizing weight 17, is defined so that the pipe assembly cannot damage itself as it is jettisoned, sinks to the ocean floor, and then assumes an essentially erect floating state in which it is anchored by the weight and which facilitates recovery. Upon actuation of quick-release devices 52, the negatively buoyant pipe assembly drops from socket member 32 and accelerates to its terminal freefall velocity; in the embodiment for which various parameters and characteristics have already been set forth, this velocity is about 8 ft. per second. Weight 17, which preferably has a cruciform shape in horizontal cross-section, is suspended sufficiently below the inlet screen by cables 41 and 48 that, once the weight strikes and embeds itself in the sea floor sediment, the net positive buoyancy of the remaining free-falling structure takes effect, in combination with viscous drag forces, to slow and stop the descent of the pipe assembly within the length of cable 48. In the presently preferred embodiment, cable 48 has a length of 300 feet; the pipe assembly will come to a stop from terminal free-fall velocity, after weight 17 strikes bottom, within approximately 200 feet. Thereafter, the pipe assembly floats substantially vertically erect, displaced only by currents, in a fully submerged state moored by weight 17 (see FIG. 16). The lower end of the structure at the upper end of cable 48 never contacts the sea floor.

A marker buoy stored in container 58 can be released automatically at the time of jettisoning of pipe assembly from the floating structure, or, as preferred, it can be held captive in its container for subsequent release by a suitable remotely controlled release mechanism at a later time as shown in FIG. 17. The marker buoy provides assistance in reconnecting to the upper end of the jettisoned pipe assembly.

Recovery of the jettisoned pipe assembly from the ocean floor is facilitated by the presence of remotely operable coupling 49 in the connection of bottom weight 17 to the lower end of the pipe assembly. That is, if it is desired to recover a jettisoned pipe assembly without its bottom weight, a suitable signal is generated to cause release mechanism 49 to operate to sever the connection between the bottom weight and the pipe assembly, thereby allowing the pipe assembly to float to the water surface. On the other hand, if it is desired to recover a jettisoned pipe assembly with its bottom weight, such recovery is facilitated by the use of reestablishment guide post 57 and keelhaul latch post 60 which provide the means by which a suitable recovery device 86 (see FIGS. 18–20) can be securely coupled to the jettisoned pipe assembly for recovery of the same. Marker buoy cable 59 provides a means for guiding the recovery device into registry with guide and latch posts 57 and 60.

Figure 21:
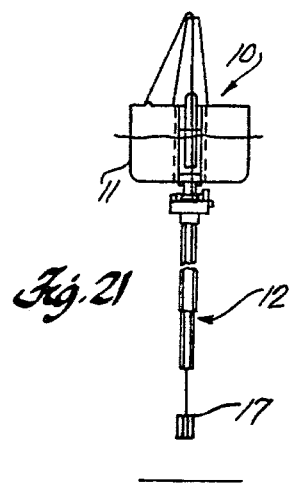

The preferred procedure for recovering a jettisoned pipe assembly, with its stabilizing weight, to hull 11 is shown in FIGS. 17 through 21. An A-frame 80 is rigged to the side of the hull (FIG. 17) so that buoy line 59 can be taken aboard the hull after release of the marker buoy (FIG. 16). Line 59 is rigged through the recovery device which is then lowered along line 59 into contact with guide post 57. The recovery device preferably is a Regan reestablishment tool which carries a lift cable 88 with a Regan latch at the bottom matable with latch post 60. When the recovery device reaches guide post 57, it cooperates with an orientation cam which properly orients the device on the post so that further movement of the device downwardly on the post causes the lift line to connect to post 60 (see FIGS. 18 and 19). The pipe assembly is then handled as described above with reference to FIGS. 10 and 11, using cable 70 and divers, to reconnect pin member 50 to socket member 32. The fully recovered and reconnected pipe assembly is shown in FIG. 21.

Pipe assembly 12 is made as light as possible consistent with the conditions it must withstand in use. The presence of sump 34 in hull 11 contributes to this objective. The normal water level in sump 34 is below the load waterline of the hull. A water level in the sump below sea level is maintained by the operation of pump 65. This difference between sea level and sump water level provides a driving head differential which is sufficient, in combination with the water flow area of the pipe assembly, to cause water to flow upwardly through the pipe assembly with the desired average mass flow rate. However, hull 11 is subjected to wave action which, besides the rolling and pitching motions already noted, can cause the hull to heave, i.e., move cyclically in a vertical direction. The volume of sump 34 below its normal water level is several times greater than the volume obtained by the product of (1) the maximum heave amplitude of the hull (double amplitude) and (2) the flow area of the pipe assembly; in the preferred arrangement shown, the sump volume is about 15 times greater than the expected maximum heave amplitude of 6.6 feet times the duct flow area of about 50 square feet. In this way, it is assured that the pipe assembly is always full of water during heaving motion of the hull, and the differential pressures across the walls of the pipe assembly, tending to collapse the pipe walls, are kept within acceptable limits. This, in turn, allows the pipe assembly to be made lighter than if it were required to withstand higher collapse loads.

The operation of pump 65 is controlled, by the assistance of suitable water level sensors in sump 34, to maintain the desired water level in the sump.

It will be apparent from the foregoing that all of the vertical loads between the floating structure and the submerged, pendulously supported pipe assembly are carried by the gimbal arrangement. The ball joint does not carry any pipe loads since it is located at the gimbal center of rotation. The ball joint functions solely as a passage which accommodates gimbal motions for carrying cold water across the gimbal-hull interface. All pipe assembly loads are carried directly into the gimbal structure, thereby minimizing creation of motion-induced bending stresses in the upper portions of the pipe assembly. The use of a ball joint seal in combination with the gimbal arrangement allows the primary cold water pump in the facility to be fixed to the floating structure. No other flexible joints, other than the ball joint, are required in the cold water duct. Suitable sealing of the ball joint is a simple matter and can be accomplished using standard pressure-loaded sealing techniques which are not intended to provide a 100% effective seal. With a small pressure drop (on the order of a 5 foot head) across the ball joint seal, any leakage across the ball joint will be minimal. The use of a male pin at the upper end of the pipe assembly, mating with a female socket below the gimbal arrangement, affords a simple mechanism for releasing the pipe assembly in an emergency. The bearing and seal rings provided between the male pin and the female socket carry the minimal moment and shear loads which may occur between the gimbal and the pipe assembly in a completed installation. Vertical loads are carried by tether cables 51. When the remote release devices (which may be electric, hydraulic or acoustic) in the tether cables are operated, the male pin carried by the upper end of the pipe assembly can easily fall free from the gimballed female socket. In use, the gimballed arrangement is located below the water line of the floating hull, thereby itself incurring minimal motions of the hull. The entire gimbal assembly can be raised in its well to above the load waterline of the hull for the purposes of maintenance.

Persons skilled in the art to which this invention pertains will appreciate that the preceding description has been presented with reference to the presently preferred embodiment of the invention as illustrated in the accompanying drawings. It will be understood, however, that the present invention can be manifested in embodiments different from the described embodiment. The preceding description sets forth the presently known best mode of practicing this invention, but certainly not all possible modes. Accordingly, workers skilled in the art will readily appreciate that modifications, alterations or variations in the arrangements and procedures described above may be practiced without departing from, and while still relying upon, the essential aspects of this invention.

What is claimed is:

1. An elongate pipe assembly adapted to be disposed substantially vertically in an ocean with its end coupled to a structure adjacent the ocean surface for support of the assembly with its lower end located above the ocean floor, the pipe assembly comprising an elongate pipe construction having upper and lower ends, and floatation means connected to the construction at the upper end thereof, the assembly overall having net negative buoyancy with the floatation means having sufficient positive buoyancy to cause the center of buoyancy of the assembly to be located closer to the floatation means than is the center of mass of the assembly so that the assembly, in the event of loss of support thereof, sinks to the ocean floor and assumes a substantially upright attitude with the upper end of the construction located above the ocean floor.

2. Apparatus according to claim 1 wherein the assembly includes a negatively buoyant weight, a line of selected length for connecting the weight to the lower end of the pipe construction, the combination of the pipe construction and the floatation means being positively buoyant with the center of buoyancy of the combination being located closer to the upper end of the construction than is the center of mass of the combination.

3. Apparatus according to claim 2 wherein the line includes a selectively remotely-operable releasable connection device.

4. Apparatus according to claim 2 including coupling means carried by the assembly at its upper end releasably connectible with a structure adjacent the ocean surface for support of the assembly by the structure.

5. Apparatus according to claim 4 wherein the coupling means is a stab coupling arranged for engagement thereof by upward movement of the pipe assembly from below the structure.

6. Apparatus according to claim 2 including connection means carried by the pipe assembly at the upper end thereof releasably connectible with a recovery device for lifting the pipe assembly, after loss of support thereof, from the ocean floor.

7. Apparatus according to claim 6 wherein the connection means includes an element disposed substantially coaxially of the pipe assembly and secured to the pipe assembly sufficiently securely to support the immersed weight of the pipe assembly.

8. Apparatus according to claim 1 wherein the floatation means includes acoustic means operable for use in locating the pipe assembly after loss of support thereof.

9. Apparatus according to claim 1 wherein the floatation means includes a tethered buoy and selectively releasable means connecting the buoy to the floatation means.

10. Apparatus according to claim 1 including an upwardly open tubular member connected to the upper end of the pipe assembly and forming a part of a connection of the pipe assembly to a supporting structure, and a post member disposed in the tubular member matable with a cooperating connection device for supporting the pipe assembly.

11. Apparatus according to claim 10 including guide means carried by the pipe assembly adjacent the upper end thereof for guiding a cooperating connection device into mating engagement with the post member.

12. Apparatus according to claim 11 wherein the guide means comprises a guide post connected to the pipe assembly adjacent the tubular member parallel to the post member.

13. Apparatus according to claim 12 wherein the guide means comprises a buoy carried by the pipe assembly adjacent the upper end thereof and deployable from the pipe assembly in response to a remotely originating command, and a line connected between the buoy and the guide post.

14. Apparatus according to claim 1 wherein the pipe construction is defined of material which is positively buoyant in sea water, and including ballast means connected to the construction at the lower end having a net negative buoyancy sufficient to exceed the positive buoyancy of said material and insufficient to exceed the positive buoyancy of the material and the floatation means.

15. Apparatus according to claim 14 wherein the material is polyethylene.

16. An elongate, negatively buoyant pipe assembly adapted to be releasably connected at an upper end thereof to a supporting structure adjacent the surface of an ocean and to depend from the supporting structure toward but not to the ocean floor, the assembly including adjacent the upper end thereof an arrangement for facilitating recovery of the assembly in the event of loss of support thereof, the recovery arrangement including floatation means having sufficient positive buoyancy and so disposed in the assembly that the assembly has overall negative buoyancy and a center of buoyancy located substantially closer to the assembly upper end than is the location of its center of mass relative to the assembly upper end, latch means arranged at the upper end of the assembly to be oriented substantially upwardly in a stable released state of the assembly, and guide means cooperably associated with the latch means for guiding into engagement with the latch means a recovery device lowered toward the assembly.

17. Apparatus according to claim 16 wherein the latch means comprises a latch post disposed parallel to the elongate extent of the pipe assembly.

18. Apparatus according to claim 17 wherein the latch post is disposed substantially coaxially of the pipe assembly.

19. Apparatus according to claim 17 wherein the guide means includes a buoy, selectively releasable means for holding the buoy in a stored location adjacent the assembly, and a line connected between the buoy and a selected location adjacent the latch post.

20. Apparatus according to claim 19 including a guide post disposed adjacent the latch post, the buoy line being connected to the guide post.

21. Apparatus according to claim 19 wherein the selectively releasable means is operable in response to a command originating remote therefrom.

22. Apparatus according to claim 16 wherein the recovery arrangement includes acoustic means operable for indicating the location of the pipe assembly.

23. Apparatus according to claim 22 wherein the acoustic means is an active acoustic device operable in response to a command originating remote therefrom.

24. Apparatus according to claim 16 wherein the pipe assembly is an ocean engineering deep water upwelling pipe assembly.

25. In an ocean thermal energy conversion facility in which cold water is conveyed from deep in an ocean to the hull of a structure floating on the ocean surface through an elongate, negatively buoyant pipe assembly of fixed length releasably coupled at its upper end to the hull, the improvement in a recovery arrangement for enabling recovery of the pipe assembly in the event the assembly should sink toward the ocean floor, the recovery arrangement including positively buoyant floatation means separate from the floating structure and secured to the pipe assembly proximately adjacent its upper end and having sufficient positive buoyancy to cause the center of buoyancy of the assembly to be located above the assembly center of mass, thus to cause the assembly to assume a substantially upright attitude relative to the ocean floor, an upwardly facing coupling element secured to the upper end of the assembly matable with a recovery device for lifting the pipe assembly, guide means carried by the pipe assembly for guiding a recovery device into mating engagement with the coupling element, and means for locating the upper end of the pipe assembly in a sunken state thereof.

26. Apparatus according to claim 25 wherein the locating means comprises an acoustic beacon.

27. Apparatus according to claim 25 wherein the locating means comprises a buoy having a normal stowed position adjacent the coupling element, a buoy tether line connected between the buoy and a selected location relative to the coupling element, and selectively operable means for releasing the buoy from its stowed position to float away from the pipe assembly.

28. Apparatus according to claim 2 wherein the length of the line is selected so that, in the event of loss of support of the assembly, the lower end of the construction does not contact the ocean floor.

29. Apparatus according to claim 2 wherein the length of the line is about 300 feet.

* * * * *

UNITED STATES PATENT AND TRADEMARK OFFICE
CERTIFICATE OF CORRECTION

PATENT NO. : 4,234,269

DATED : November 18, 1980

INVENTOR(S) : Abraham Person, Sherman B. Wetmore, James F. McNary

It is certified that error appears in the above—identified patent and that said Letters Patent is hereby corrected as shown below:

Column 1, line 33, between "BACKGROUND OF THE INVENTION" and "Field of the Invention", insert as a new paragraph:

-- The Government has rights in this invention pursuant to Contract No. DE-AC03-78ET20539 (formerly ET-78-C-03-1785) awarded by the U.S. Department of Energy. --

Signed and Sealed this

Fifteenth Day of June 1982

[SEAL]

Attest:

GERALD J. MOSSINGHOFF

Attesting Officer    Commissioner of Patents and Trademarks